(12) United States Patent
Sompalli et al.

(10) Patent No.: US 7,977,005 B2
(45) Date of Patent: Jul. 12, 2011

(54) EDGE-PROTECTED CATALYST-COATED MEMBRANE ELECTRODE ASSEMBLIES

(75) Inventors: Bhaskar Sompalli, Rochester, NY (US); Brian A. Litteer, Henrietta, NY (US); John P. Healy, Pittsford, NY (US); Susan G. Yan, Fairport, NY (US); Hubert A. Gasteiger, Rochester, NY (US); Wenbin Gu, Pittsford, NY (US); Gerald W. Fly, Geneseo, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1642 days.

(21) Appl. No.: 11/127,044

(22) Filed: May 11, 2005

(65) Prior Publication Data

US 2005/0271929 A1 Dec. 8, 2005

Related U.S. Application Data

(63) Continuation-in-part of application No. 10/909,265, filed on Jul. 30, 2004, which is a continuation-in-part of application No. 10/266,965, filed on Oct. 8, 2002, now Pat. No. 6,861,173.

(51) Int. Cl.
*H01M 2/00* (2006.01)

(52) U.S. Cl. ........................ 429/465; 429/490

(58) Field of Classification Search ............... 429/465, 429/490, 492, 516, 524; 427/115, 421.1
See application file for complete search history.

(56) References Cited

U.S. PATENT DOCUMENTS

| 3,134,697 | A   |   | 5/1964  | Niedrach             |
|-----------|-----|---|---------|----------------------|
| 4,460,444 | A   | * | 7/1984  | Maskalick ...... 205/619 |
| 5,272,017 | A   |   | 12/1993 | Swathirajan et al.   |
| 6,472,090 | B1  | * | 10/2002 | Colbow et al. ...... 429/443 |
| 7,267,902 | B2  | * | 9/2007  | Brunk et al. ...... 429/35 |

FOREIGN PATENT DOCUMENTS

| JP | 5021077    | 1/1993 |
| JP | 5174845    | 7/1993 |
| JP | 10154521   | 6/1998 |
| JP | 2003123777 | 4/2003 |
| WO | 2004023576 | 3/2004 |

* cited by examiner

*Primary Examiner* — Jennifer Michener
*Assistant Examiner* — Monique Wills
(74) *Attorney, Agent, or Firm* — Reising Ethington P.C.

(57) ABSTRACT

A fuel cell including an anode-side catalyst coated membrane and a cathode-side catalyst coated membrane. At least a portion of a reduced-permeability layer is disposed between the ionically conductive membrane and the anode-side and cathode-side gas diffusion media, wherein the reduced-permeability layer is formed of a material that has a permeability that is less than a permeability of the ionically conductive member. The reduced-permeability layer may also be formed of a material that is softer than the ionically conductive membrane.

61 Claims, 8 Drawing Sheets

*Prior Art*

EDGE-PROTECTED CATALYST-COATED MEMBRANE ELECTRODE ASSEMBLIES

CROSS-REFERENCE TO RELATED APPLICATIONS

This application is a continuation-in-part application of U.S. patent application Ser. No. 10/909,265 filed Jul. 30, 2004, which is a continuation-in-part of U.S. patent application Ser. No. 10/266,965 filed Oct. 8, 2002 which is now U.S. Pat. No. 6,861,173, and wherein the disclosures of both of these priority documents are hereby incorporated by reference.

FIELD OF THE INVENTION

The present invention relates to components useful in a fuel cell, particularly, to the membrane, anode, cathode and reduced-permeability layers, and to the arrangement and methods of assembling the same.

BACKGROUND OF THE INVENTION

Fuel cells are being developed as a power source for electric vehicles and other applications. Fuel cells are known to include a variety of components including a proton exchange membrane, an anode, a cathode and gas distribution elements.

Fuel cells typically include a proton exchange or polymer electrolyte membrane (PEM) sandwiched between a cathode catalyst layer and an anode layer to form a membrane electrode assembly (MEA). Gas diffusion media (GDM) engage each of the cathode catalyst layer and the anode catalyst layer. The catalyst layers may be coated on the GDM, and such a structure is known as catalyst-coated diffusion media (CC-DM). Alternatively, the catalyst may be coated on the PEM, and such a structure is known as catalyst-coated membrane (CCM).

Figure 1:
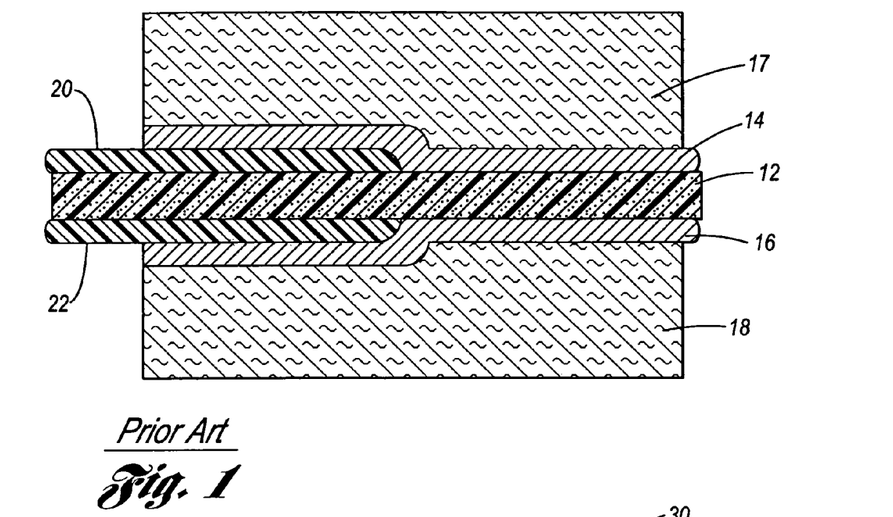
FIG. 1 is a cross-sectional view of a prior art CC-DM.

Heretofore, edge-protection using subgaskets have been applied in both CC-DM and CCM fuel cells. FIG. 1 illustrates a prior art CC-DM 30 which includes a first GDM 17 having an anode catalyst layer 14 coated thereon. A second GDM 18 having a cathode catalyst layer 16 coated thereon is also provided. A proton exchange membrane 12 is provided and a first subgasket 20 is positioned to cover a portion of the upper surface of the membrane 12 along the periphery thereof. A second subgasket 22 is positioned to cover a portion of the lower surface of the membrane 12 along the periphery thereof. The proton exchange membrane 12, first subgasket 20 and second subgasket are interposed between the anode CC-DM and cathode CC-DM.

Figure 2:
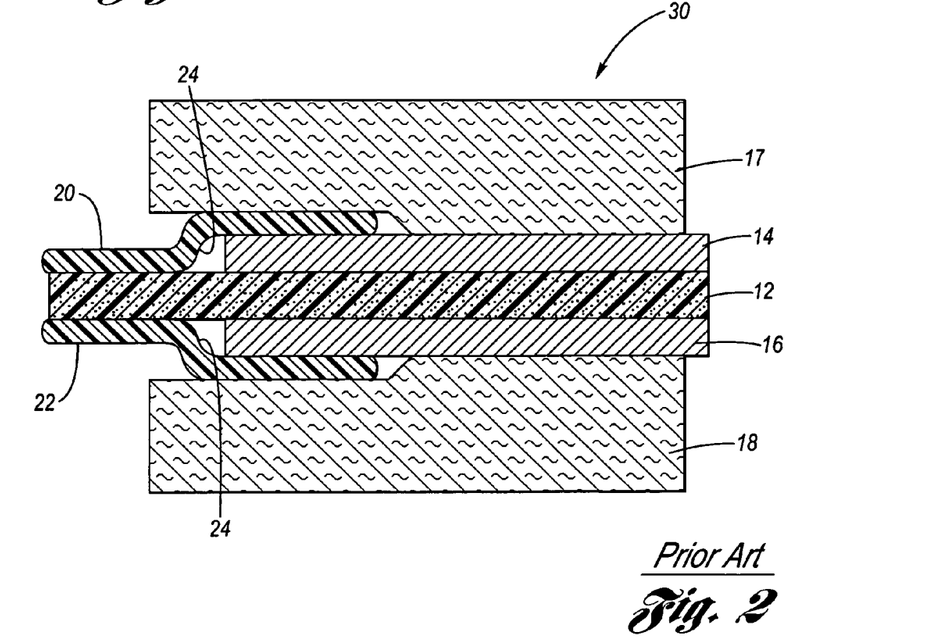
FIG. 2 is a cross-sectional view of a prior art CCM.

FIG. 2 illustrates a prior art CCM 10 which include a proton exchange membrane 12 having a anode catalyst layer 14 coated on an upper surface of the membrane 12, and a cathode catalyst layer 16 coated on a lower surface of the membrane 12. A first subgasket 20 is positioned to cover a portion of the membrane 12 and a portion of the anode catalyst layer 14 along the peripheral edge of each. In a like manner, a second subgasket 22 is positioned to cover a portion of the membrane 12 and a portion of the cathode catalyst layer 16 along the peripheral edge of each. A tenting region, 24, may be formed and is defined by a small void between the GDM 17 or 18 and the anode 14 or cathode 16, respectively.

Figure 3:
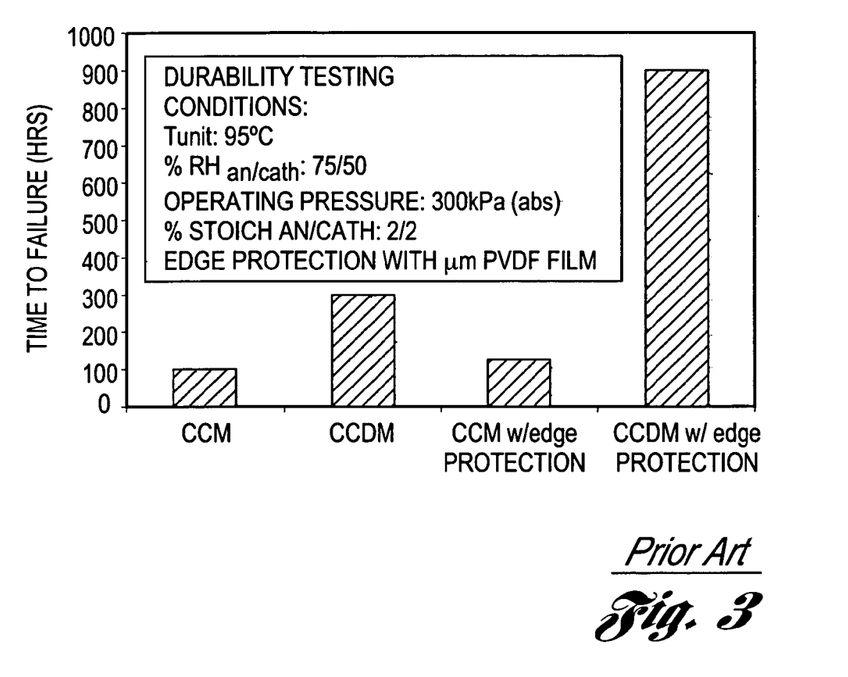
FIG. 3 is a graphic representation of the relative performance improvement of prior art edge-protected CCM versus CC-DM fuel cells.

Durability testing, graphically illustrated in FIG. 3, has shown that prior-art CCMs, as depicted in FIG. 2 are considerably less durable than CC-DMs. CC-DMs routinely outlast CCMs in harsh conditions such as 95° C., 300 kPa (abs) and 75/50% Relative Humidity. As shown in FIG. 3, the beneficial effect of edge-protection in prior art CCMs is relatively minor (125 hours for edge-protected vs. 100 for un-protected). However, in the case of prior art CC-DMs there is a 3-fold increase in the lifetime of the MEAs from 300 to 900 hours for unprotected versus protected CC-DMs.

The present invention provides alternatives to the prior art.

SUMMARY OF THE INVENTION

One embodiment of the invention includes a product comprising: an ionically conductive membrane having an anode face and a cathode face; a first reduced-permeability layer over at least one of the anode face and cathode face, and wherein the reduced-permeability layer includes an opening therethrough defined by a window inner edge; wherein the first reduced-permeability layer has a permeability that is less than a permeability of the ionically conductive membrane; a first layer having a plurality of side edges and the first layer having a central portion received in the opening in the first reduced-permeability layer, and wherein the central portion of the first layer comprises a catalyst and nowhere along any of the side edges of the first layer and the window inner edge of the first reduced-permeability layer is there a gap greater than 500 micrometers.

One embodiment of the invention includes a process comprising: providing an ionically conductive membrane having an anode face and a cathode face; placing an anode side reduced-permeability layer over the anode face, and wherein the anode side reduced-permeability layer includes an opening therethrough; placing an anode catalyst decal comprising an anode catalyst layer having at least a central portion and a backing so that the central portion of the anode catalyst layer is aligned with the opening in the anode side reduced-permeability layer; placing a cathode side reduced-permeability layer over the cathode face, and wherein the cathode side reduced-permeability layer includes an opening therethrough; placing a cathode catalyst decal comprising a cathode catalyst layer having at least a central portion and a backing so that the central portion of the cathode catalyst layer is aligned with the opening in the cathode side reduced-permeability layer; hot pressing the anode catalyst decal, anode side reduced-permeability layer, membrane, cathode catalyst decal, cathode side reduced-permeability layer together so that the central portion of the anode catalyst layer is received in the opening in the anode side reduced-permeability layer and so that the central portion of the cathode catalyst layer in received in the opening in the cathode side reduced-permeability layer; removing the backing from both of the anode catalyst decal and the cathode catalyst decal; and wherein each of the anode side reduced-permeability layer and cathode side reduced-permeability layer have a permeability that is less than a permeability of the ionically conductive membrane. Preferably the overlaying catalyst layer adheres well to the reduced-permeability layer.

Another embodiment of the invention includes a process comprising: providing an ionically conductive membrane having an anode face and a cathode face; placing an anode side reduced-permeability layer over the anode face, and wherein the anode side reduced-permeability layer includes an opening therethrough; placing an anode catalyst decal consisting essentially of a central portion of an anode catalyst layer and a backing so that the central portion of the anode catalyst layer is aligned with the opening in the anode side reduced-permeability layer; placing a cathode side reduced-permeability layer over the cathode face, and wherein the cathode side reduced-permeability layer includes an opening therethrough; placing a cathode catalyst decal consisting essentially of a central portion of a cathode catalyst layer and a backing so that the central portion of the cathode catalyst layer is aligned with the opening in the cathode side reduced-permeability layer; hot pressing the anode catalyst decal, anode side reduced-permeability layer, membrane, cathode catalyst decal, cathode side reduced-permeability layer together so that the central portion of the anode catalyst layer is received in the opening in the anode side reduced-permeability layer and so that the central portion of the cathode catalyst layer is received in the opening in the cathode side reduced-permeability layer; removing the backing from the anode catalyst decal and removing the backing from the cathode catalyst decal; wherein the central portion of the anode catalyst layer includes at least one side edge spaced from the anode side reduced-permeability layer a distance so that an anode side gap exists between the central portion of the anode catalyst layer and the anode side reduced-permeability layer, and further comprising flowing a first material comprising a first filler and a first volatile vehicle at least into the anode side gap to fill the same and allowing the first vehicle to evaporate; wherein the central portion of the cathode catalyst layer includes at least one side edge spaced from the cathode side reduced-permeability layer a distance so that a cathode side gap exist between the central portion of the cathode catalyst layer and the cathode side reduced-permeability layer, and further comprising flowing a second material comprising a second filler and a second volatile vehicle at least into the cathode side gap to fill the same and allowing the second vehicle to evaporate; and wherein each of the anode side reduced-permeability layer and cathode side reduced-permeability layer each have a permeability that is less than a permeability of the ionically conductive membrane.

Another embodiment of the invention includes a product comprising: an ionically conductive membrane having an anode face and a cathode face; an anode side reduced-permeability layer over the anode face, and wherein the anode side reduced-permeability layer includes an opening therethrough; an anode catalyst layer having at least a central portion and wherein the central portion of the anode catalyst layer is received in the opening in the anode side reduced-permeability layer; a cathode side reduced-permeability layer over the cathode face, and wherein the cathode side reduced-permeability layer includes an opening therethrough; a cathode catalyst layer having at least a central portion and wherein the central portion of the cathode catalyst layer is received in the opening in the cathode side reduced-permeability layer; wherein each of the anode side reduced-permeability layer and cathode side reduced-permeability layer each have a permeability that is less than a permeability of the tonically conductive membrane; an anode side gas diffusion media having a first surface facing the anode catalyst layer, and a cathode side gas diffusion media having a second surface facing the cathode catalyst layer and wherein at least one of the anode catalyst layer does not extend along the entire length of the first surface; and the cathode catalyst does not extend along the entire length of the second surface.

Another embodiment of the invention includes a product comprising: an tonically conductive membrane having an anode face and a cathode face; an anode side reduced-permeability layer over the anode face, and wherein the anode side reduced-permeability layer includes an opening therethrough; an anode catalyst layer having at least a central portion and wherein the central portion of the anode catalyst layer is received in the opening in the anode side reduced-permeability layer; a cathode side reduced-permeability layer over the cathode face, and wherein the cathode side reduced-permeability layer includes an opening therethrough; a cathode catalyst layer having at least a central portion and wherein the central portion of the cathode catalyst layer is received in the opening in the cathode side reduced-permeability layer; wherein each of the anode side reduced-permeability layer and cathode side reduced-permeability layer each have a permeability that is less than a permeability of the ionically conductive membrane; an anode side gas diffusion media having a first surface facing the anode catalyst layer, and a cathode side gas diffusion media having a second surface facing the cathode catalyst layer; the central portion of the anode catalyst layer and anode side reduced-permeability layer each being bonded to the membrane but not bonded to the anode side gas diffusion media, and the central portion of the cathode catalyst layer and cathode side reduced-permeability layer each being bonded to the membrane but not bonded to the anode side gas diffusion media.

These and other embodiments of the invention will be apparent from the following brief description of the drawings, detailed description of exemplary embodiments and appended claims and drawings.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

The following description of the preferred embodiments is merely exemplary in nature and is in no way intended to limit the invention, its application, or uses.

Figure 4A:
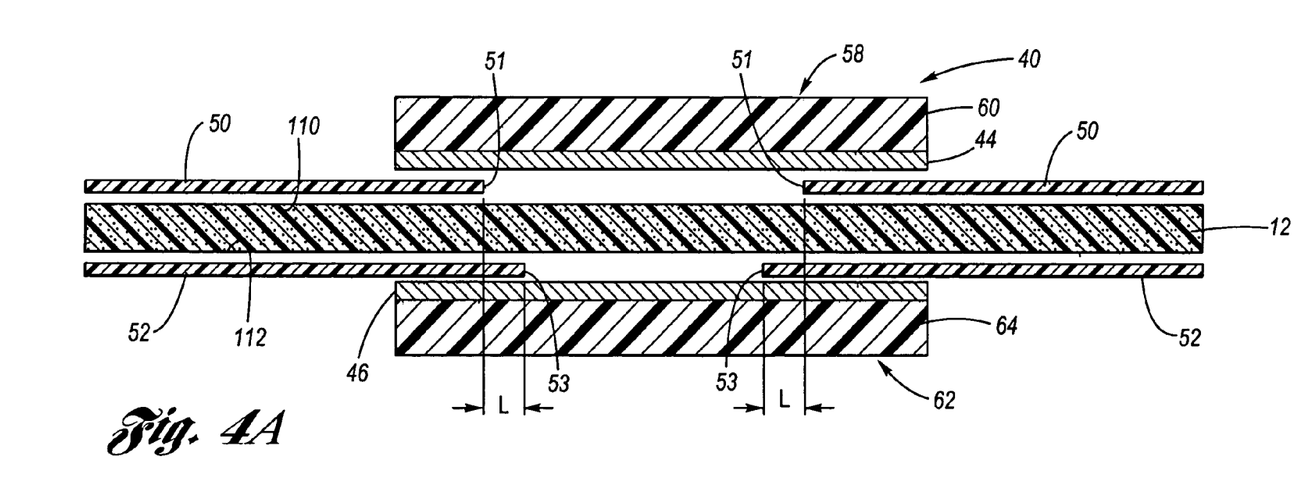
FIGS. 4A-B illustrate a method of making a edge-protected CCM according to one embodiment of the present invention.
Figure 4B:
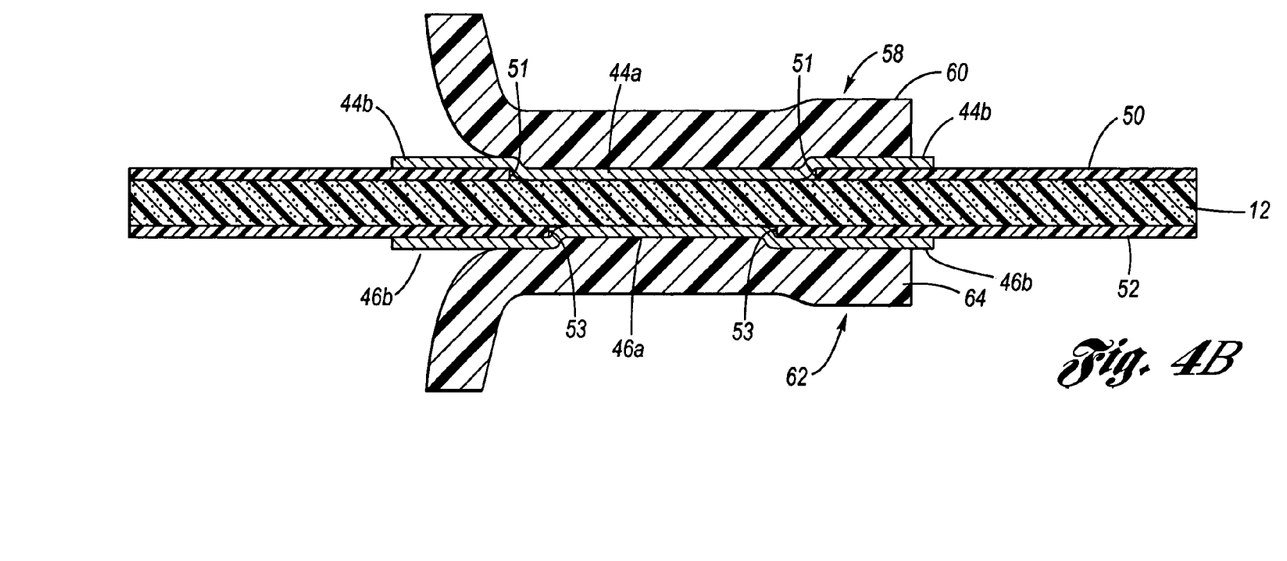

FIGS. 4A-B illustrates one embodiment of a method of making a membrane-electrode-assembly according to the present invention. A proton exchange or polymer electrolyte membrane 42 is provided. The membrane 42 has an anode face 110 and a cathode face 112. An anode side reduced-permeability layer 50 is provided overlying the anode face 110. The anode side reduced-permeability layer 50 has an opening therethrough defined by a window inner side edge 51. Similarly, a cathode side reduced-permeability layer 52 is provided underlying the cathode face 112. The cathode side reduced-permeability layer 52 has an opening therethrough defined by a window inner edge 53. The anode side and cathode side reduced-permeability layers 50, 52 may be a film, coating, layer, subgasket or any other structure that provides for low gas permeation.

In one embodiment of the invention, the window inner edge 51 of the anode side reduced-permeability layer 50 is not vertically aligned with the window inner edge 53 of the cathode side reduced-permeability layer 52. In another embodiment of the invention, the cathode side reduced-permeability layer 52 overlaps the anode side reduced-permeability layer 50 a length (designated by the line L) measured toward the center of the opening 53. In another embodiment the length L is greater than 10 micrometers, preferably greater than 100 micrometers, and most preferably greater than 1000 micrometers. Accordingly the active area of the anode catalyst layer may be greater than the active area of the cathode catalyst layer.

In another embodiment of the invention, the window inner edge 53 of the cathode side reduced-permeability layer 52 is not vertically aligned with the window inner edge 51 of the anode side reduced-permeability layer 50. In another embodiment of the invention, the anode side reduced-permeability layer 50 overlaps the cathode side reduced-permeability layer 52 a length (designated by the line L) measured toward the center of the opening 51. In another embodiment the length L is greater than 10 micrometers, preferably greater than 100 micrometers, and most preferably greater than 1000 micrometers. This configuration is preferred particularly for drier operations. Accordingly the active area of the cathode catalyst layer may be greater than the active area of the anode catalyst layer.

Figure 8:
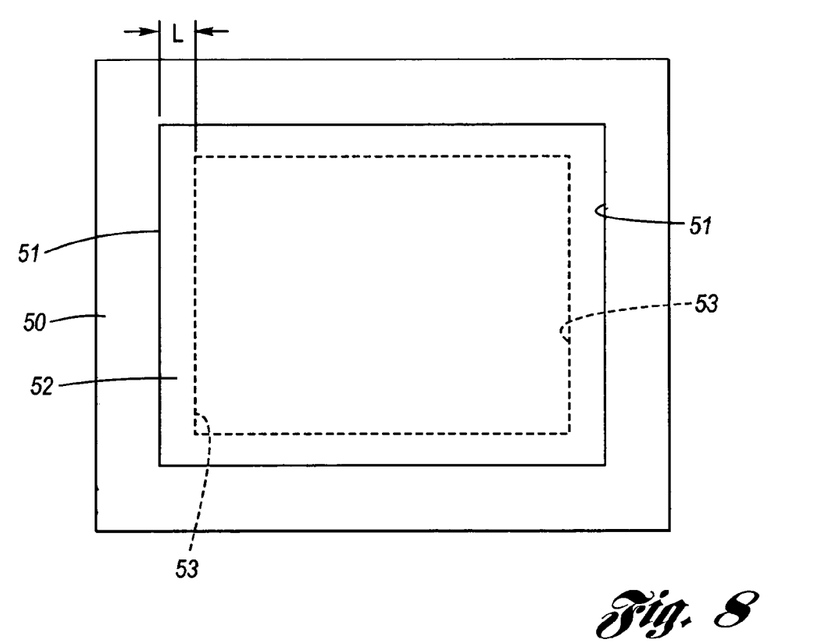
FIG. 8 is a plan view of a CCM according to one embodiment of the invention illustrating the geometric proportions and relative position of reduced-permeability layers with respect to each other.

In one embodiment of the invention, which will be best appreciated from FIG. 8, the opening 51 in the anode side reduced-permeability layer 50 has an area (measured along lines parallel to the longitudinal length and width of the layer 50) that is greater than the area (similarly measured) of opening 53 the cathode side reduced-permeability layer 52.

Referring again to FIG. 4A, in one embodiment of the invention, an anode catalyst decal 58 is provided including an anode catalyst layer 44 and a removable backing 60. In one embodiment of the invention, the anode catalyst layer 44 spans the opening 51 and overlaps a portion of the anode side reduced-permeability layer 50. In another embodiment the anode catalyst layer may fit within the opening 51 and spaced a distance from the window inner edge 51 as will be describe hereafter. A cathode catalyst decal 62 is provided including a cathode catalyst layer 46 and a removable backing 64. In one embodiment, the cathode catalyst layer 46 spans the opening 53 and overlaps a portion of the cathode side reduced-permeability layer 52. In another embodiment, the anode catalyst layer 46 may fit within the opening 53 and spaced a distance from the window inner edge 53 as will be describe hereafter.

As shown in FIG. 4B, in one embodiment of the invention, the anode catalyst decal 58 and cathode catalyst decal 62 are hot pressed onto the anode side reduced-permeability layer 50 and through the opening 51 and onto the anode face 110 of the membrane 42, and onto the cathode side reduced-permeability layer 52 and through the opening 53 and onto the cathode face 112 of the membrane 42, respectively. In one embodiment of the invention the hot pressing is conducted at a temperature ranging from about 120 F to about 500 F, preferably from 250 to 400 F., and at a pressure ranging from about 25 psi to about 1000 psi, preferably from 100 to 500 psi. The backings 60 and 64 are flexible and are peeled away from the anode catalyst 44 and the cathode catalyst 46, respectively. The catalyst layer 44 or 46 may transfer to the reduced-permeability layer, depending on the surface properties of the material. It is preferred that the catalyst layer 44 or 46 transfer uniformly from the central region to the peripheral region where the reduced permeability layers are overlaid on the membrane 42 on the anode and cathode faces 110, 112. The reduced-permeability layers 50, 52 should either be of a material to which the catalyst layers 44, 46 adhere well naturally, or should be treated to facilitate such adhesion (eg., plasma-treatment, radio-frequency discharge treatments, or use other surface treatments known to one familiar to the art).

Figure 5:
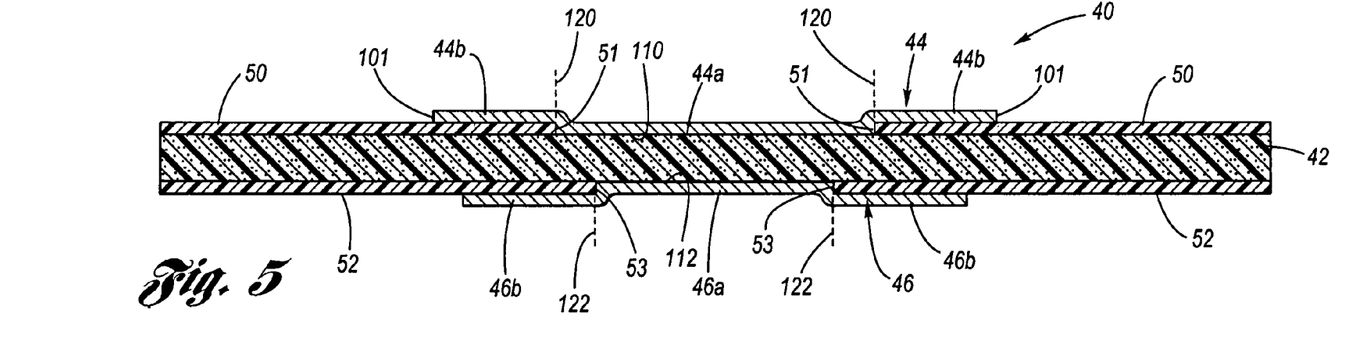
FIG. 5 is a cross-sectional view of a CCM according to one embodiment of the present invention.

Referring now to FIG. 5, one embodiment of the invention includes an anode catalyst layer 44 which includes a central portion 44a that engages the anode face 110 of the membrane 42, and a peripheral portion 44b that overlaps a portion of the anode side reduced-permeability layer 50. The central portion 44a and peripheral portion 44b are defined in part by the dotted line 120. In one embodiment the central portion 44a abuts the side edge 51 of the anode side reduced-permeability layer 50 so that tenting is substantially eliminated. In a similar manner, a cathode catalyst layer 46 which includes a central portion 46a that engages the cathode face 112 of the membrane 42, and a peripheral portion 46b that overlaps a portion of the cathode side reduced-permeability layer 52. The central portion 46a and peripheral portion 46b are defined in part by the dotted line 122.

Figure 9:
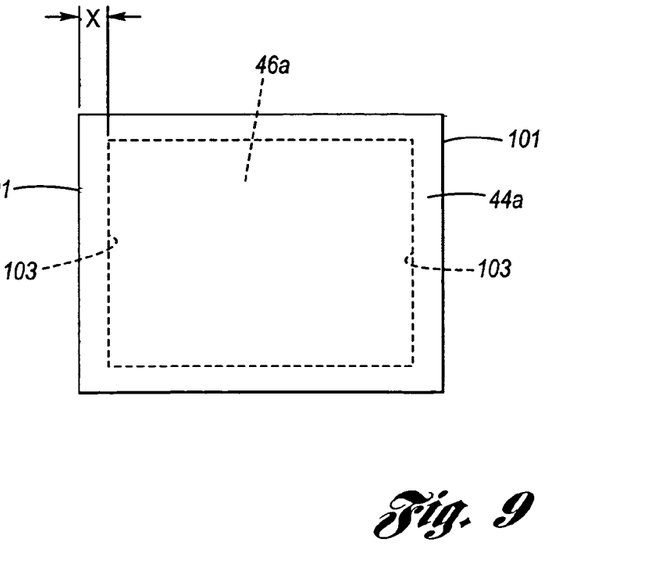
FIG. 9 is a plan view of a CCM according to one embodiment of the invention illustrating the geometric proportions and relative position of anode and cathode catalyst layers with respect to each other.

FIG. 9 is an illustration of the relative geometric proportions and alignment of the central portion 44a of the anode catalyst layer 44 with respect to the central portion 46a of the cathode catalyst layer 46 according to one embodiment of the invention. The area of the central portion 44a of the anode catalyst layer 44 that engages the membrane 42 is greater than the area of the central portion 46a of the cathode catalyst layer 46 that engages the membrane 42. In this embodiment of the invention, the anode catalyst layer 44 overlaps the edge 103 of the cathode catalyst layer 46. In another embodiment the length of the overlap X, of the anode catalyst layer 44 over the cathode catalyst layer along a side 103 thereof, is greater than 10 micrometers, preferably greater than 100 micrometers, and most preferably greater than 1000 micrometers.

In another embodiment of the invention the relative size and positions of the anode catalyst layer 44 and cathode catalyst layer 46 are the reverse of that shown in FIG. 9. The alignment of the central portion 46a of the cathode catalyst layer 46 with respect to the central portion 44a of the anode catalyst layer 44 is such that the cathode catalyst layer 46 overlaps the anode catalyst layer along a side thereof a distance X. In another embodiment the length of the overlap X, of the cathode catalyst layer 46 over the anode catalyst layer 44 along a side 101 thereof, is greater than 10 micrometers, preferably greater than 100 micrometers, and most preferably greater than 1000. The area of the central portion 46a of the cathode catalyst layer 46 that engages the membrane 42 is greater than the area of the central portion 44a of the anode catalyst layer 44 that engages the membrane 42. In this embodiment of the invention, the cathode catalyst layer 46 overlaps the edge 101 of the cathode catalyst layer 44

Figure 7:
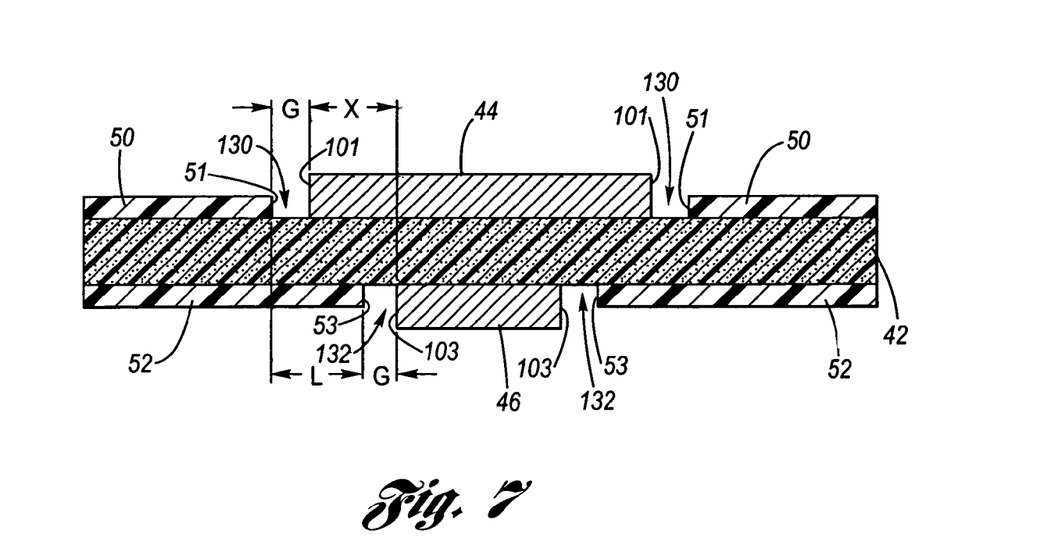
FIG. 7 is a cross-sectional view of a CCM according to one embodiment of the present invention.

Referring now to FIG. 7, another embodiment of the invention includes an anode catalyst layer 44 that is formed in the opening 51 of the anode side reduced-permeability layer 50. The anode catalyst layer 44 includes side edges 101 that are spaced a distance, designated by line G, from the window inner edge 51 of the anode side reduced-permeability layer 50 so that a gap 130 exists between the anode catalyst layer 44 and the window inner edge 51. In a similar manner, a cathode catalyst layer 46 is formed in the opening 53 of the cathode side reduced-permeability layer 52. The cathode catalyst layer 46 includes side edges 103 that are spaced a distance, designated by line G, from the window inner edge 53 of the cathode side reduced-permeability layer 52 so that a gap 132 exists between the cathode catalyst layer 46 and the window inner edge 53. The gaps 130 and 132 may be equal or different sizes. In one embodiment of the invention, the length G of each of the gaps 130 and 132 is greater than the manufacturing tolerances for depositing the catalyst layers 44 and 46 next to the associated reduced-permeability layers 50 and 52, respectively. In one embodiment of the invention, the length G of each of the gaps 130, 132, must be less than 500 micrometers, along the entire perimeter of the catalyst edge 101, 103, respectively. More preferably, the length G of the gap 130, 132 should be less than 100 micrometers. Most preferably, the gap 130, 132 should be less than 10 micrometers or no gap at all. For all embodiments described herein, the anode catalyst layer 44 and the cathode catalyst layer 46 may be deposited on the membrane 42 using the above described decal method, or any other method known to those skilled in the art including spraying, coating, painting, or screen printing a catalyst material.

Figure 6:
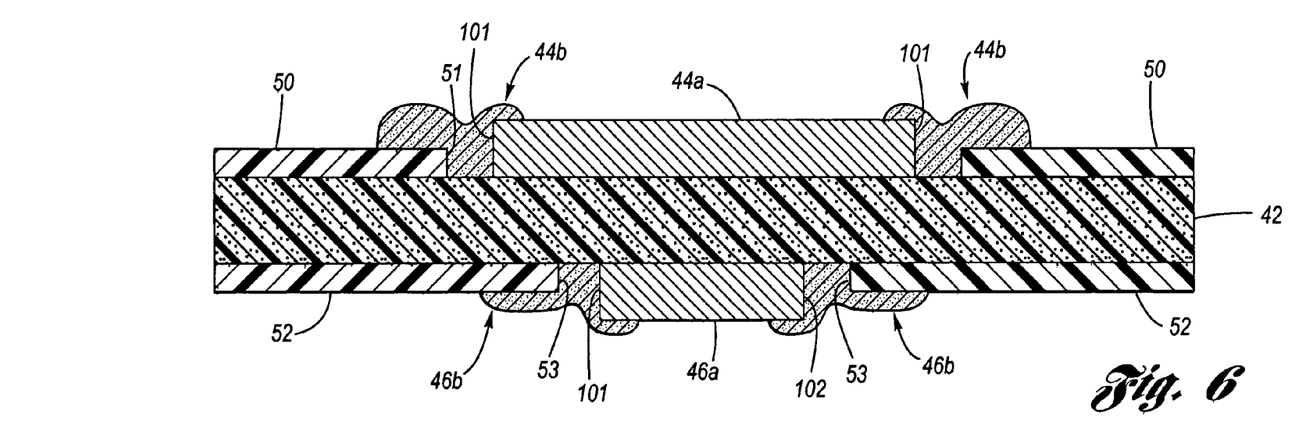
FIG. 6 is a cross-sectional view of a CCM according to one embodiment of the present invention.

Referring now to FIG. 6, one embodiment of the invention includes depositing a central portion 44a and 46a of the anode and cathode catalyst layers on the membrane 42 using a decal method but wherein the side edges 101 and 103 of the central portions 44a and 46a are spaced a distance from the window inner edges 51 and 53 of the anode and cathode reduced-permeability layer 50 and 52, respectively. The distance that the side edges 101 and 103 are respectively spaced from the window inner edge 51 and 53 are controlled by the manufacturing tolerances for depositing the catalyst layers 44, 46 and reduced-permeability layers 50, 52. Thereafter, peripheral portions 44b, 46b are deposited to at least fill the gaps 130, 132, and more preferably over portions of the reduced-permeability layers 50, 52 and filling the gaps between the side edges 101, 103 and window inner edges 51, 53 and engaging the central portions 44a, 46a, respectively. The peripheral portions 44b, 46b may be deposited using a material that flows. In one embodiment of the invention, the material used may flow within the temperature range of about 25-150° C. In one embodiment of the invention, the peripheral portions 44b, 46b are painted, coated, sprayed, or screen printed onto the above described surfaces. The peripheral portions 44b, 46b may include a catalyst loading substantially equal to or less than the central portions 44a, 46a, respectively, or the peripheral portions 44b, 46b may have a gradient concentration of catalyst or no catalyst at all. Optionally, an ionomer, such as perfluorinated sulfonic acid polymers may be included in the material used to fill the gap. Suitable volatile vehicles for the flowable material may be lower carbon C alcohols such as methanol, propanol, or water. Alternatively, the flowable material may include a filler that has reduced-permeability. Examples of suitable reduced-permeability materials for the flowable material include at least one of a polyimide, polyethylene, naphthalate, ethylene tetrafluoroethylene, polyvinylidene fluoride, polyester, polyamide, co-polyamide, polyamide elastomer, polyurethanes, polyurethane elastomer, and silicone.

Figure 10:
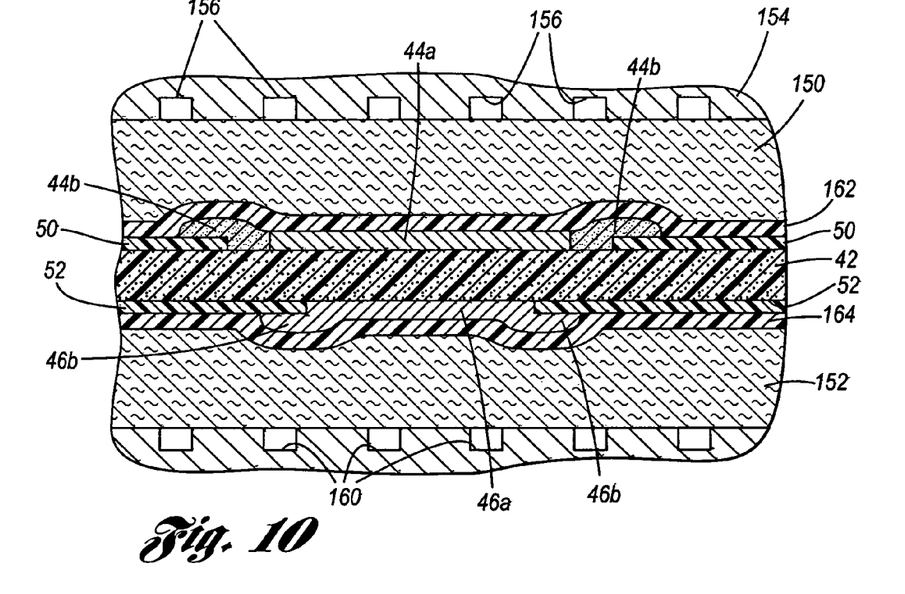
FIG. 10 is a cross-sectional view of a fuel cell stack with portions broken away according to one embodiment of the present invention.

Referring now to FIG. 10, one embodiment of the invention includes a fuel cell stack which may include a plurality of CCMs according to any of the embodiments of FIGS. 5-7, and further includes an anode side GDM 150 and a cathode side GDM 152. The anode side GDM 150 includes a surface 200 facing the anode catalyst layer 44. In one embodiment of the invention, the anode catalyst layer 44 does not extend along the entire length of the surface 200. In a similar manner, the cathode side GDM 152 includes a surface 202 facing the cathode catalyst layer 46. In one embodiment of the invention, the cathode catalyst layer 46 does not extend along the entire length of the surface 202. Optionally, an anode side microporous layer 162 may be interposed between the anode catalyst layer 44 and the anode side GDM 150, and similarly, a cathode side microporous layer 164 may be interposed between the cathode catalyst layer 46 and the cathode side GDM 152. In one embodiment of the invention, the central portion 44a of the anode catalyst layer 44 and anode side reduced-permeability layer 50 each are bonded to the membrane 42 but are not bonded to the anode side gas diffusion media 150, and the central portion 46a of the cathode catalyst layer 46 and cathode side reduced-permeability layer 52 each are bonded to the membrane 42 but are not bonded to the anode side gas diffusion media 152. A first bipolar plate 154, having a plurality of gas flow channels 156 defined therein, engages the anode side GDM 150, and a second bipolar plate 158, having a plurality of gas flow channels 160 defined therein, engages to cathode side GDM 152. One embodiment of the invention includes a fuel cell stack comprising a plurality of fuel cells, each of the plurality of fuel cells comprising an assembly comprising: an ionically conductive membrane having an anode face and a cathode face; a first reduced-permeability layer over at least one of the anode face and cathode face, and wherein the reduced-permeability layer includes an opening therethrough defined by a window inner edge; wherein the first reduced-permeability layer has a permeability that is less than a permeability of the ionically conductive membrane; a first layer having a plurality of side edges and the first layer having a central portion received in the opening in the first reduced-permeability layer, and wherein the central portion of the first layer comprises a catalyst; and wherein for substantially every fuel cell of the fuel stack nowhere along any of the side edges of the first layer and the window inner edge of the first reduced-permeability layer is there a gap greater than 500 micrometers, 100 micrometers, 10 micrometers, and most preferably there is no gap at all.

Figure 11:
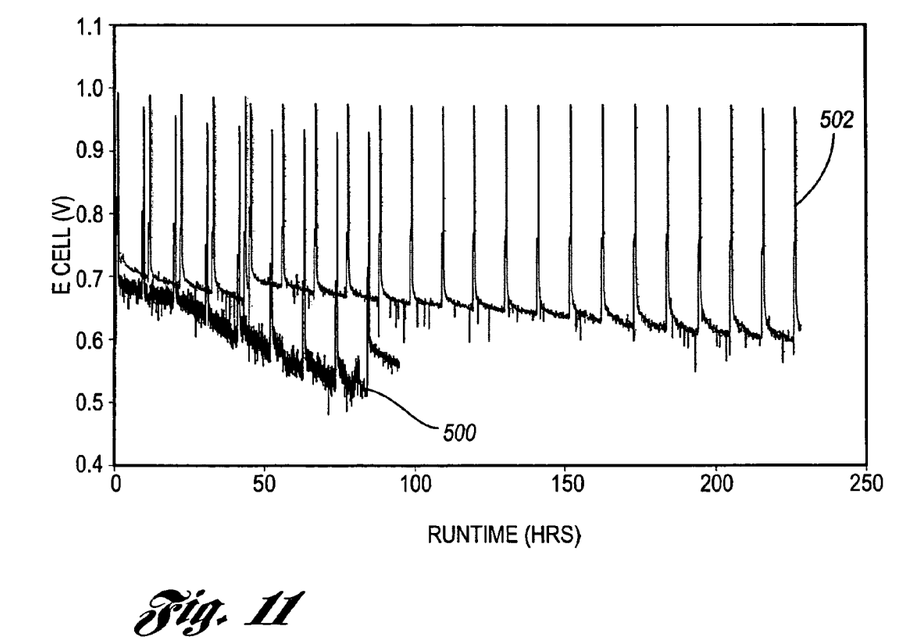
FIG. 11 is a graphic representation of the improvement in durability of a CCM with edge protection according to one embodiment of the invention.

The graph of FIG. 11 illustrates a comparison of the durability of a conventional prior-art CCM 30 in FIG. 2 and a CCM 40 with edge protection according to one embodiment of the invention as illustrated in FIG. 5 under durability testing conditions of 95° C. 300 kPa (abs), 70/50% RH, 2/2 stoich H₂/air. The CCM 30 of the prior art lasted 95-100 hours prior to the development of membrane pinholes at the subgasket edges. In contrast, a CCM 40 according to one embodiment of the invention was robust, free of pinholes, even at 225 hours of testing. CCMs according to the other embodiments illustrated in FIGS. 4A-B, 6-10 would also have similar improved durability.

It has also been discovered that for fuel cells operating at greater than 50% relative humidity (in the vicinity of the reduced permeability layers), embodiments wherein the anode catalyst layer 44 is larger than the cathode catalyst layer 46, may provide improved durability. FIGS. 5-7 and 10 illustrate embodiments in which the anode catalyst layer 44 is larger that the cathode catalyst layer 46.

The membrane 42 is preferably a solid polymer membrane electrolyte, and preferably a proton exchange membrane (PEM). Preferably, the membrane 42 has a thickness in the range of about 10 micrometers-100 micrometers and most preferably a thickness of about 25 micrometers. Polymers suitable for such membrane electrolytes are well known in the art and are described in U.S. Pat. Nos. 5,272,017 and 3,134,697 and elsewhere in the patent and non-patent literature. It should be noted, however, that the composition of the membrane 42 may comprise any of the proton conductive polymers conventionally used in the art. Preferably, perfluorinated sulfonic acid polymers such as NAFION® are used.

The membrane 42 is a cation permeable, proton conductive membrane, having H⁺ ions as the mobile ion; the fuel gas is hydrogen (or reformate) and the oxidant is oxygen or air. The overall cell reaction is the oxidation of hydrogen to water and the respective reactions at the anode and cathode are $H_2=2H^++2e^-$ (anode) and $\frac{1}{2}O_2+2H^++2e^-=H_2O$ (cathode).

The composition of the anode catalyst layer 44 and cathode catalyst layer 46 preferably comprises electrochemically active material dispersed in a polymer binder which, like the membrane 42, is a proton conductive material such as NAFION®. The electrochemically active material preferably comprises catalyst-coated carbon or graphite particles. The anode catalyst layer 44 and cathode catalyst layer 46 will preferably include platinum or platinum alloys as the catalyst. Although the anode catalyst layer 44 and cathode catalyst layer 46 in the figures are shown to be different sizes, 44 and 46 may be the same in size. Further, the cathode may be larger than the anode. A preferred thickness of the anode and cathode is in the range of about 2-30 micrometers, and most preferably about 10 micrometers.

The material selected for use as the reduced-permeability layers 50, 52 may include permeability to oxygen and hydrogen gas that is less than the permeability to oxygen and hydrogen gas of the ionically conductive membrane 42. When the permeability of the reduced-permeability layers 50, 52 is less than the permeability of the ionically conductive membrane 42, the cross-over rate of the reactant fuel cell gases is significantly reduced at the edges of the membrane electrode assembly 40, and similarly the concentration of oxygen and hydrogen in the membrane is significantly reduced. This is advantageous because the chemical degradation of the electrolyte in the membrane and the electrode occurs due both the simultaneous presence of oxygen and hydrogen in the membrane, and to gas cross-over through the membrane 42 (i.e., either hydrogen from the anode to the cathode, or oxygen from the cathode to the anode) and, therefore, impermeable layers 50, 52 mitigate chemical degradation.

More specifically, during the normal operation of a fuel cell, hydrogen and oxygen gas may permeate across the membrane 42 to both the cathode 46 and anode 44, respectively, such that oxygen is in the presence of the hydrogen fuel. When these reactant gases come into contact with the electrochemically active material of the anode 44 and cathode 46, the oxygen is reduced and reacts with H⁺ ions produced from the oxidation of the hydrogen fuel gas. This ensuing side reaction between the reduced oxygen and H⁺ ions produces $H_2O_2$ as follows:

$$O_2+2H^++2e^-=H_2O_2$$

This production of $H_2O_2$ has been to known to cause a degradation of the membrane 42 and, thus, a diminished fuel cell life and performance. Furthermore, it is to be understood that other possible mechanisms of chemical degradation of the electrolyte in the membrane and the electrodes can be mitigated by preventing or at least inhibiting gas cross-over through membrane 42. These gases are more prone to permeate the membrane 42 at the edges of the membrane 42 at gaps between the elements of the fuel cell caused by manufacturing tolerances. As such, a condensed flux of the reactant gases may collect at the edges of the anode 44 and cathode 46. The degradation of the membrane 42, therefore, typically occurs at the edges of the anode 44 and cathode 46.

In order to suppress chemical degradation and eliminate the production of $H_2O_2$, the reduced-permeability layers 50, 52 are formed of a material that has permeability to oxygen and hydrogen that is less than the membrane 42. For example, when a NAFION® membrane such as N112 is used as the membrane 42, the reduced-permeability layers 50, 52 should have a permeability to oxygen less than 3500 cc-mil/(100 in²-24 hr-atm) at 77° F./100% RH. Preferably, the reduced-permeability layers 50, 52 should have an oxygen permeability less than or equal to 200 cc-mil/(100 in²-24 hr-atm) at 77° F./100% RH. A preferable material for achieving such a permeability is, for example, ethylene tetrafluoroethylene (ETFE) which has a oxygen permeability of 184 cc-mil/(100 in²-24 hr-atm) at 77° F./100% RH. Most preferably, the reduced-permeability layers 50, 52 should have an oxygen permeability less than or equal to 25 cc-mil/(100 in²-24 hr-atm) at 77° F./100% RH. Suitable materials that achieve the most preferable oxygen permeability are, for example, polyimide (sold under the tradename Kapton, 25 cc-mil/(100 in²-24 hr-atm) at 77° F./100% RH) or polyvinylidene fluoride (PVDF, 3.4 cc-mil/(100 in²-24 hr-atm) at 77° F./100% RH).

The permeability to hydrogen in the reduced-permeability layers 50, 52 should be less than $1.5 \times 10^{-8}$ ml(STP)-cm$_{thick}$/(s-cm²-cm$_{Hg}$) at 80° C., 270 kPa, 100% RH; preferably less than or equal to $1 \times 10^{-9}$ ml(STP)-cm$_{thick}$/(s-cm²-cm$_{Hg}$) at 80° C., 270 kPa, 100% RH; and most preferably less than or equal to $5 \times 10^{-10}$ ml(STP)-cm$_{thick}$/(s-cm²-cm$_{Hg}$) at 80° C., 270 kPa, 100% RH. Suitable materials for achieving the above hydrogen permeabilities are, for example, Kapton ($4.7 \times 10^{-10}$ ml(STP)-cm$_{thick}$/(s-cm²-cm$_{Hg}$) at 80° C., 270 kPa, 100% RH) and polyethylene naphthalate (PEN, $2 \times 10^{-10}$ ml(STP)-cm$_{thick}$/(s-cm²-cm$_{Hg}$) at 80° C., 270 kPa, 100% RH).

Further, although ETFE, Kapton, PVDF, and PEN are discussed as being preferable materials for attaining the above-described oxygen and hydrogen permeabilities, it should be understood that other materials may be selected for use as the reduced-permeability layers 50, 52 so long as the material has permeability to oxygen and hydrogen less than the membrane 42. Examples of other materials include polyesters, polyamides, co-polyamides, polyamide elastomers, polyurethanes, polyurethane elastomers, silicones, and other thermoplastic elastomers. By reducing the permeability to the reactant gases at the edges of the anode 44 and cathode 46, the cross-over of the reactant gases that can cause the degradation of the membrane 42 may be reduced and/or prevented.

As stated above, the reduced-permeability layers 50, 52 also protect the edges of the membrane 42 from unmitigated heat production from crossover, and protects the membrane from contact with the bipolar plate and other sealing surface.

When selecting appropriate materials for use as the reduced-permeability layers 50, 52 to prevent the cross-over of the reactant gases across the membrane 42 of the MEA 40, it should be understood that a first material may be selected for use as an anode-side reduced-permeability layer 50 and a second material may be selected for use as a cathode-side reduced-permeability layer 52. More specifically, since hydrogen fuel is used on the anode side of the MEA 40, it may be preferable to select a material for the anode side reduced-permeability layers 50 that has a lower permeability to hydrogen. Conversely, since oxygen or air is used on the cathode side of the MEA 40, it may be preferable to select a material for the cathode side reduced-permeability layer 52 that has a lower permeability to oxygen. In this manner, the cross-over of the reactant gases can further be prevented and a longer lifespan of the MEA 40 can be achieved.

It should also be understood that the material for the reduced-permeability layers 50, 52 may be selected according to, in addition to its permeability to air and hydrogen, its softness at the MEA processing temperature (determined, e.g., by its glass transition temperature or its melting temperature). That is, the reduced-permeability layers 50, 52 may be formed of a material that is soft and pliable at the MEA processing temperature. In this regard, a preferable material for the reduced-permeability layers 50, 52 is, but not limited to, polyvinylidene fluoride (PVDF). Other materials include polyethylene naphthalate (PEN) and polyimide. Optionally, additional sealing members (not shown) may be provided and overlay at least a portion of the reduced-permeability layers 50, 52.

By utilizing reduced-permeability layers 50, 52 that are softer and more pliable, malleable, and yielding than the membrane 42, the reduced-permeability layers 50, 52 will compress and deform when the elements of the MEA 40 are compressed together to complete the assembly. In this manner, the reduced-permeability layers 50, 52 will bond to or laminate with the membrane 42. This bonding or lamination of the elements of the MEA 40 results in a unitary structure that increases the robustness of the MEA 40 because the elements of the MEA 40 will be subjected to uniform pressures throughout the entire surface of the MEA 40.

The gas diffusion media layers may be made from materials such as carbon fiber paper and carbon cloth and may have a thickness ranging from 100 to 500 micrometers. The microporous layers 162 and 164 may be made from materials such as carbon blacks and hydrophobic constituents such as PTFE and PVDF, and may have a thickness ranging from 2 to 100 micrometers.

Figure 12:
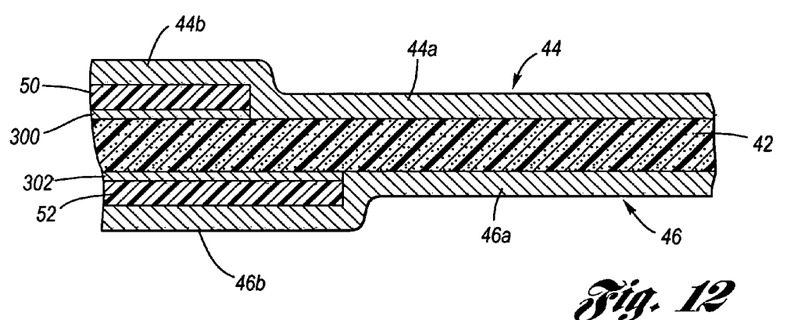
FIG. 12 is a sectional view, with portions removed, of product according to one embodiment of the invention showing a thin hydrogen/oxygen recombination catalyst coating on the side of each of the reduced-permeability layers that face a proton-conducting membrane.

Referring now to FIG. 12, another embodiment of the invention includes the addition of a thin hydrogen/oxygen recombination catalyst coating 300, 302 on the side of the reduced-permeability layer 50, 52 which faces the proton-conducting membrane 42. The cathode side hydrogen/oxygen recombination catalyst coating 302 on the reduced permeability layer 52 further reduce the concentration of oxygen at the membrane/reduced-permeability interface by selective oxidation of oxygen permeating through, or diffusing around and underneath the cathode side reduced-permeability layer 52, with hydrogen permeating through the proton-conducting membrane 42, thereby lowering the effective oxygen concentration in the proton-conducting membrane which reduces the chemical degradation rate of the proton-conducting membrane material. The anode side hydrogen/oxygen recombination catalyst coating 300 on the reduced permeability layer 50 further reduce the concentration of hydrogen at the membrane/reduced-permeability interface by selective oxidation of hydrogen permeating through, or diffusing around and underneath the reduced-permeability layer 50, with oxygen permeating through the proton-conducting membrane 42, thereby lowering the effective hydrogen concentration in the proton-conducting membrane 42 which reduces the chemical degradation rate of the proton-conducting membrane material.

Suitable hydrogen/oxygen recombination catalysts which can be coated onto the reduced-permeability layer 50, 52 are preferably thin coatings of platinum, ruthenium, iridium, palladium, rhodium, mixtures of these metals with each other; as well as, alloys between any or more of the above, platinum metals with transition metals (e.g., cobalt, nickel, etc.). Other suitable hydrogen/oxygen recombination catalysts are Ag, Au, Sn, Si, Ti, Zr, Al, Hf, Ta, Nb, Ce and combinations thereof including oxides thereof where applicable. The hydrogen/oxygen recombination catalysts are deposited onto the reduced-permeability layer 50, 52 as thin layers of <10 microns, preferably <100 nm, most preferably <20 nm, as thin layers reduce the cost of the possible noble metal constituents. In one embodiment of the invention, the coatings 300, 302 of the hydrogen/oxygen recombination catalyst are non-porous in order to reduce gas diffusion within the film or coating 300, 302.

Films and coatings of the hydrogen/oxygen recombination catalyst can be applied by, for example, physical vapor deposition, chemical vapor deposition, and other thin-film coating methods known in the art. The above listed hydrogen/oxygen recombination catalysts may be in the form of supported catalysts (suitable support materials are carbon black, graphitized carbon black, graphite, and other oxide-based supports like $TiO_2$, $ZrO_2$, etc.) which can be coated as thin layers using polymeric binders (e.g., PTFE, PFSA ionomers, kynar, etc.). However, it is most preferable to use unsupported hydrogen/oxygen recombination catalysts which afford the desired lower gas porosity and are generally thought to produce less radicals which would damage the proton-conducting membrane. In another embodiment, hydrogen/oxygen recombination catalysts listed above may also be incorporated into the reduced-permeability layers.

Figure 13:
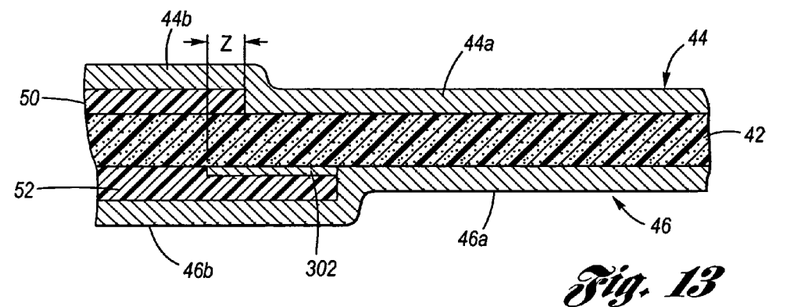
FIG. 13 is a sectional view, with portions removed, of product according to one embodiment of the invention showing a thin hydrogen/oxygen recombination catalyst coating on the side of only one of the reduced-permeability layers and wherein the thin hydrogen/oxygen recombination catalyst coating overlaps a portion of the other reduced-permeability layer.

While the hydrogen/oxygen recombination catalyst may be coated onto the entire reduced-permeability layer 50, 52, it is also sufficient to coat it only on the reduced-permeability layer which has the smaller window 51, 53. As shown in FIG. 13, the hydrogen/oxygen recombination catalyst coating 302 is on the cathode side reduced-permeability layer 52 which has a small window. However, the scope of the invention includes embodiments wherein the anode side reduced-permeability layer 50 has a smaller window 51 and the hydrogen/oxygen recombination catalyst coating is only on the anode side reduced-permeability layer 50. If coated on the reduced-permeability layer with the smaller window, the hydrogen/oxygen recombination catalyst may be coated onto the entire reduced-permeability layer or only in the region up to where the reduced-permeability layer on the other face of the membrane starts or whereby the hydrogen/oxygen recombination layer 302 overlaps the other reduced-permeability layer 50 a distance Z of at least 25 microns, preferably 250 microns, and most preferably of 1000 microns.

It should be understood from the above, that the hydrogen/oxygen recombination catalyst may also be coated directly onto the proton-conducting membrane 42 in the regions which subsequently will be covered by either or both of the reduced-permeability layers 50, 52. In this case, the hydrogen/oxygen recombination catalyst layer 300, 302 preferably extends all the way up to the inner window edge 51, 53 of the respective reduced-permeability layer 50, 52 respectively, and most preferably extends into the inner window 51, 53 of the respective reduced-permeability layer by up to 500 microns.

Figure 14:
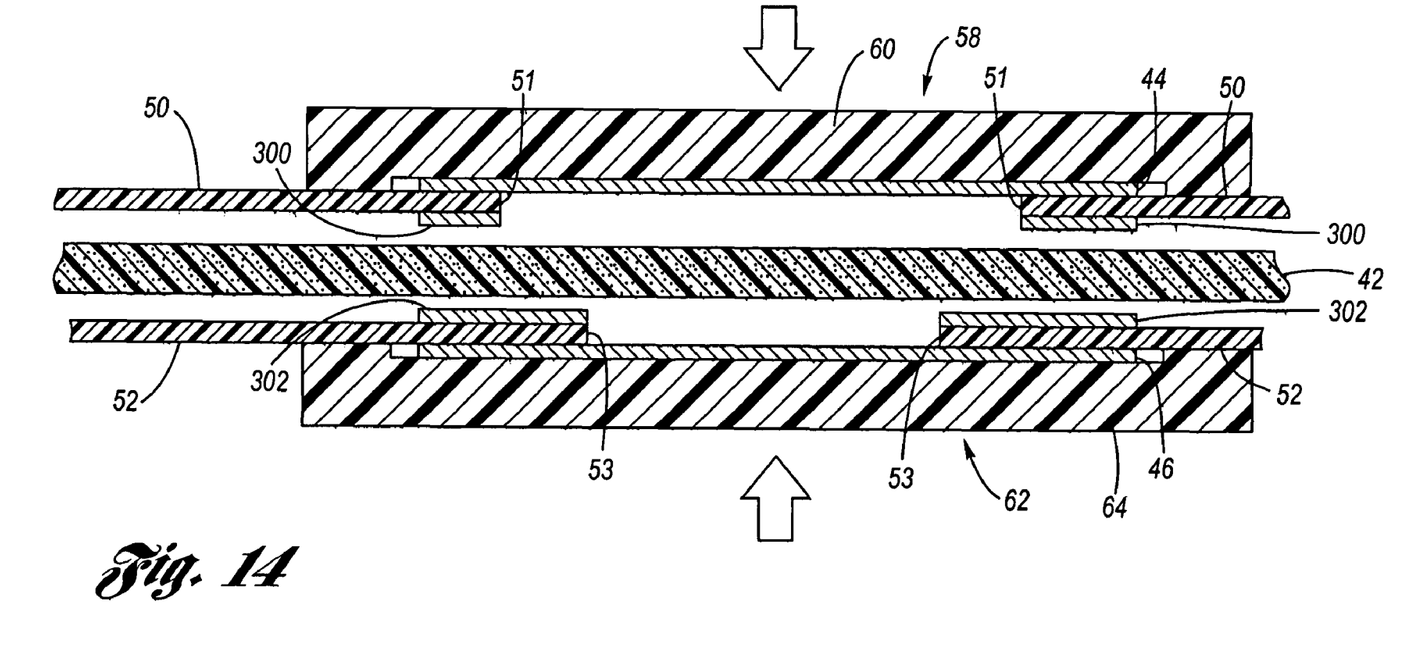
FIG. 14 illustrates one embodiment of a method according to the present invention including providing decal including a decal backing having a catalyst layer thereon and a reduced-permeability layer overlapping a portion of the catalyst layer, and hot pressing the to a membrane.

Referring now to FIG. 14, another embodiment of the invention includes a method including providing an anode catalyst decal 58 including an anode catalyst layer 44 on a removable backing 60. An anode side reduced-permeability layer 50 is provided that overlaps at least a portion of the anode catalyst layer 44 and is secured thereto. Optionally, the reduced-permeability layer 50 may be attached to the decal backing 60. An anode side hydrogen/oxygen recombination catalyst layer 300 covers at least a portion of the reduced-permeability layer 50. Alternatively, the anode side hydrogen/oxygen recombination catalyst layer 300 may be already applied to the membrane 42. Similarly, a cathode catalyst decal 62 is provided including a cathode catalyst layer 46 on a removable backing 64. A cathode side reduced-permeability layer 52 is provided that overlaps a portion of the cathode catalyst layer 46 and is secured thereto. Optionally, the reduced-permeability layer 52 may be attached to the decal backing 64. A cathode side hydrogen/oxygen recombination catalyst layer 302 covers at least a portion of the reduced-permeability layer 52. Alternatively, the cathode side hydrogen/oxygen recombination catalyst layer 302 may be already applied to the membrane 42. The anode decal 58, membrane 42 and cathode decal 62 may be hot pressed together as previously described.

Figure 15:
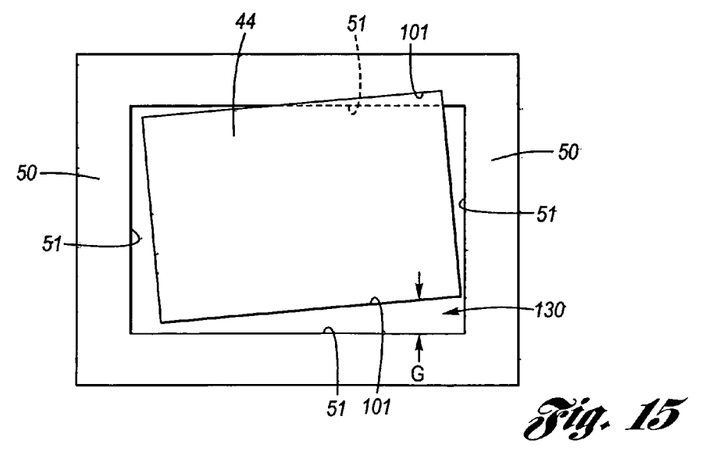
FIG. 15 is a plan view of a product according to one embodiment of the invention showing a gap between the window of a reduced-permeability layer and a catalyst layer at one of several possible locations along the side edge of the catalyst layer.

FIG. 15 illustrates another embodiment of the invention in which the gap 130, between the window inner edge 51 of the anode side reduced-permeability layer 50 and the side edge 101 of the anode catalyst layer 50, is a distance G that is less than 500 micrometers, along the catalyst edge 101. More preferably, the length G of the gap 130 should less than 100 micrometers, and most preferably less than 10 micrometers. As shown in FIG. 15, the gap 130 may occur in one location or multiple locations randomly along the perimeter of the catalyst layer 44. At some of the locations the catalyst layer may randomly extend over the reduced-permeability layer 50 or not reach all the way up to the reduced-permeability layer 50. The gap 130 may not necessarily extend along the entire length of the side edge 101 of the anode catalyst layer 44. The gap 130 may occur in multiple and random locations due to the misalignment of the reduced-permeability layer 50 with the catalyst layer 44 and/or because the side edges 101, 103 of the catalyst layer 44, 46, respectively, may not be perfectly straight. The invention includes the discovery that assemblies having gaps 130, 132 less than 500 micrometers, preferable less than 100 micrometers, and most preferably less than 10 micrometers have improved durability. In a most preferred embodiment of the invention there is no gap 130, 132 anywhere along the entire side edge 101, 103 of the catalyst layer 44, 46 respectively. Another embodiment of the invention includes a method of assembling a membrane 42, reduced-permeability layers 50, 52, and catalyst layers 44, 46 as described herein so that the gaps 130, 132 are consistently less than 500 micrometers, and preferably less than 100 micrometers, and most preferably less than 10 micrometers. One embodiment of the invention includes assembling more than 2000 assemblies consecutively, each including a membrane 42, reduced-permeability layers 50, 52, and catalyst layers 44, 46 as described herein so that the gaps 130, 132 are consistently less than 500 micrometers, and preferably less than 100 micrometers, and most preferably less than 10 micrometers. Another embodiment of the invention includes making a plurality of assemblies including aligning a membrane 42, reduced-permeability layers 50, 52, and catalyst layers 44, 46 as described herein and bonding the same together, repeating the aligning and bonding steps, and periodically inspecting at least one of the bonded assemblies and adjusting the alignment of each catalyst layer with its respective reduced-permeability layer if the gaps 130, 132 are greater than 500 micrometers, and preferable if the gaps 130, 132 are greater than 100 micrometers, and most preferably greater than 10 micrometers.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A process comprising:
   depositing a reduced-permeability layer over a proton-conducting membrane, the reduced permeability layer having an opening therein defined by a window inner edge;
   depositing a catalyst layer over the membrane so that a central portion catalyst layer is received in the opening, the catalyst layer having at least one side edge; the reduced-permeability layer and catalyst layer being arranged so that nowhere along the entire length of the side edge of the catalyst layer is there a gap between the catalyst side edge and the window inner edge that is greater than 500 micrometers.

2. A process as set forth in claim 1 wherein nowhere along the entire length of the side edge of the catalyst layer is there a gap between the catalyst side edge and the window inner edge that is greater than 100 micrometers.

3. A process as set forth in claim 1 wherein nowhere along the entire length of the side edge of the catalyst layer is there a gap between the catalyst side edge and the window inner edge that is greater than 10 micrometers.

4. A process as set forth in claim 1 wherein the depositing a reduced-permeability layer comprises at least one of coating a reduced-permeability material, spraying a reduced-permeability material, screen printing a reduced-permeability material or applying a decal comprising a reduced-permeability material.

5. A process a set forth in claim 1 further comprising depositing an adhesive on the membrane prior to depositing the reduced-permeability layer over the membrane.

6. A process as set forth in claim 1 wherein the depositing a catalyst layer comprises at least one of coating a material comprising a catalyst, spraying a material comprising a catalyst, screen printing a material comprising a catalyst or applying a decal comprising a material comprising a catalyst.

7. A process comprising:
   providing a membrane, a reduced-permeability layer over the membrane and wherein the reduced-permeability layer include an opening therethrough defined by a window inner edge, and a catalyst layer having a central portion received in the opening and wherein the catalyst layer include at least one side edge;
   placing a first layer over the reduced-permeability layer along the window inner edge and over that catalyst layer along the side edge of the catalyst layer, and wherein the first layer comprises at least one of a catalyst and a reduced-permeability material.

8. A process as set forth in claim 7 wherein the placing a first layer comprises at least one of coating a material, spraying a material, screen printing a material and applying a decal having the first layer thereon.

9. A process as set forth in claim 7 further comprising selecting the reduced-permeability layer so that the first layer bonds or laminates thereto.

10. A process as set forth in claim 7 further comprising pretreating the reduced-permeability layer to provide improved bonding or adhering of the reduced-permeability layer to the membrane and catalyst layer.

11. A process as set forth in claim 7 wherein placing a first layer comprises painting a flowable material along the side edge of the catalyst layer.

12. A process comprising:
providing an ionically conductive membrane having a first face and a second face;
placing decal assembly over one of the first face and second face, the decal assembly comprising a first catalyst layer having at least a central portion, a first reduced-permeability layer having an opening therethrough and wherein at least a portion of the first reduced-permeability layer overlaps a portion of the first catalyst layer, and a backing so that the central portion of the first catalyst layer is aligned with the opening in the first reduced-permeability layer;
hot pressing the assembly decal and membrane together so that the central portion of the first catalyst layer is received in the opening in the first reduced-permeability layer;
removing the backing from the assembly decal;
and wherein the first reduced-permeability layer has a permeability that is less than a permeability of the ionically conductive membrane.

13. A process as set forth in claim 12 further comprising a hydrogen/oxygen recombination catalyst, and wherein the hydrogen/oxygen recombination catalyst is at least one of: impregnated into the first reduced-permeability layer; or coated on at least one of the first reduced-permeability layer, or the membrane.

14. A process as set forth in claim 12 further comprising a hydrogen/oxygen recombination catalyst coating on the first reduced-permeability layer of the assembly decal.

15. A process as set forth in claim 12 further comprising a hydrogen/oxygen recombination catalyst coating on the first reduced-permeability layer of the assembly decal and wherein the hydrogen/oxygen recombination catalyst coating extends into the opening of the first reduced-permeability layer.

16. A process as set forth in claim 15 wherein the hydrogen/oxygen recombination catalyst comprises at least one of Pt, Ru, Ir, Pd, Rh, Ag, Au, Sn, Si, Ti, Zr, Al, Hf, Ta, Nb, Ce, combinations thereof, oxides thereof or alloys thereof.

17. A process comprising:
providing an ionically conductive membrane having an anode face and a cathode face;
placing an anode catalyst decal comprising an anode catalyst layer having at least a central portion, an anode side reduced-permeability layer and wherein the anode side reduced-permeability layer includes an opening therethrough, and a backing so that the central portion of the anode catalyst layer is aligned with the opening in the anode side reduced-permeability layer;
placing a cathode catalyst decal comprising a cathode catalyst layer having at least a central portion, a cathode side reduced-permeability layer and wherein the cathode side reduced-permeability layer includes an opening therethrough; and a backing so that the central portion of the cathode catalyst layer is aligned with the opening in the cathode side reduced-permeability layer;
hot pressing the anode catalyst decal, anode side reduced-permeability layer, membrane, cathode catalyst decal, cathode side reduced-permeability layer together so that the central portion of the anode catalyst layer is received in the opening in the anode side reduced-permeability layer and so that the central portion of the cathode catalyst layer is received in the opening in the cathode side reduced-permeability layer;
removing the backing from each of the anode catalyst decal and the cathode catalyst decal;
and wherein each of the anode side reduced-permeability layer and cathode side reduced-permeability layer has a permeability that is less than a permeability of the ionically conductive membrane.

18. A process as set forth in claim in claim 17 further comprising a hydrogen/oxygen recombination catalyst, the hydrogen/oxygen recombination catalyst being at least one of: impregnated into at least one of the anode reduced-permeability layer or cathode reduced-permeability layer; coated on the membrane; or coated on at least one of the anode reduced-permeability layer or cathode reduced-permeability layer.

19. A process as set forth in claim 17 further comprising a hydrogen/oxygen recombination catalyst, the hydrogen/oxygen recombination catalyst being coated on at least one of the anode reduced-permeability layer or cathode reduced-permeability layer.

20. A process as set forth in claim 17 further comprising a hydrogen/oxygen recombination catalyst, the hydrogen/oxygen recombination catalyst being impregnated into at least one of the anode reduced-permeability layer or cathode reduced-permeability layer.

21. A process as set forth in claim 17 further comprising a hydrogen/oxygen recombination catalyst, the hydrogen/oxygen recombination catalyst being coated on membrane.

22. A process as set forth in claim 21 wherein the hydrogen/oxygen recombination catalyst comprises at least one of Pt, Ru, Ir, Pd, Rh, Ag, Au, Sn, Si, Ti, Zr, Al, Hf, Ta, Nb, Ce, combinations thereof, oxides thereof or alloys thereof.

23. A process comprising:
providing an ionically conductive membrane having an anode face and a cathode face;
placing an anode side reduced-permeability layer over the anode face, and wherein the anode side reduced-permeability layer includes in opening therethrough;
placing an anode catalyst decal comprising an anode catalyst layer having at least a central portion and a backing so that the central portion of the anode catalyst layer is aligned with the opening in the anode side reduced-permeability layer;
placing a cathode side reduced-permeability layer over the cathode face, and wherein the cathode side reduced-permeability layer includes in opening therethrough;
placing a cathode catalyst decal comprising a cathode catalyst layer having at least a central portion and a backing so that the central portion of the cathode catalyst layer is aligned with the opening in the cathode side reduced-permeability layer;
hot pressing the anode catalyst decal, anode side reduced-permeability layer, membrane, cathode catalyst decal, cathode side reduced-permeability layer together so that the central portion of the anode catalyst layer is received in the opening in the anode side reduced-permeability layer and so that the central portion of the cathode catalyst layer in received in the opening in the cathode side reduced-permeability layer;

removing the backing from each of the anode catalyst decal and the cathode catalyst decal;

and wherein each of the anode side reduced-permeability layer and cathode side reduced-permeability layer have a permeability that is less than a permeability of the ionically conductive membrane.

24. A process as set forth in claim 23 wherein the opening in the anode side reduced-permeability layer has an area greater than the area of the opening in the cathode side reduced-permeability layer.

25. A process as set forth in claim 23 wherein the central portion of the anode catalyst layer extends along the entire perimeter over the opening of the cathode side reduced permeability layer.

26. A process as set forth in claim 23 wherein the membrane comprises perfluorinated sulfonic acid polymers or other proton-conducting membranes.

27. A process as set forth in claim 23 wherein the opening in the cathode side reduced-permeability layer extends inwardly overlapping the opening in the anode side permeability layer along the entire perimeter from the anode side reduced permeability layer.

28. A process as set forth in claim 23 wherein the anode catalyst layer further comprises a peripheral portion overlapping at least a portion of the anode side reduced-permeability layer.

29. A process as set forth in claim 23 wherein the cathode catalyst layer further comprises a peripheral portion overlapping at least a portion of the cathode side reduced-permeability layer.

30. A process as set forth in claim 23 wherein the anode catalyst layer consist solely of the central portion, and wherein the central portion of the anode catalyst layer includes at least one side edge spaced from the anode side reduced-permeability layer by a distance no greater than 500 micrometers.

31. A process as set forth in claim 23 wherein the cathode catalyst layer consist solely of the central portion, and wherein the central portion of the cathode catalyst layer includes at least one side edge spaced from the cathode side reduced-permeability layer a distance ranging no greater than 500 micrometers.

32. A process as set forth in claim 23 wherein the central portion of the anode catalyst layer includes at least one side edge spaced from the anode side reduced-permeability layer a distance so that an anode side gap exists between the central portion of the anode catalyst layer and the anode side reduced-permeability layer, and further comprising flowing a material comprising a filler and a volatile vehicle at least into the anode side gap to fill the same and allowing the vehicle to evaporate.

33. A process as set forth in claim 32 wherein the filler comprises a catalyst.

34. A process as set forth in claim 32 wherein the filler comprises at least one of a polyimide, polyethylene naphthalate, ethylene tetrafluoroethylene, polyvinylidene fluoride, polyester, polyamide, co-polyamide, polyamide elastomer, polyurethanes, polyurethane elastomer, or silicone.

35. A process as set forth in claim 32 wherein the central portion of the anode catalyst layer includes at least one side edge spaced from the anode side reduced-permeability layer a distance so that an anode side gap exists between the central portion of the anode catalyst layer and the anode side reduced-permeability layer, and further comprising flowing a material comprising a filler and a volatile vehicle into the anode side gap to fill the same and over at least a portion of the anode side reduced-permeability and allowing the vehicle to evaporate to provide an anode peripheral portion layer connected to the central portion of the anode catalyst layer.

36. A process as set forth in claim 35 wherein the filler comprises a catalyst.

37. A process as set forth in claim 35 wherein the filler comprises at least one of a polyimide, polyethylene naphthalate, ethylene tetrafluoroethylene, polyvinylidene fluoride, polyester, polyamide, co-polyamide, polyamide elastomer, polyurethanes, polyurethane elastomer, or silicone.

38. A process as set forth in claim 35 wherein the central portion of the cathode catalyst layer includes at least one side edge spaced from the cathode side reduced-permeability layer a distance so that a cathode side gap exists between the central portion of the cathode catalyst layer and the cathode side reduced-permeability layer, and further comprising flowing a material comprising a filler and a volatile vehicle at least into the cathode side gap to fill the same and allowing the vehicle to evaporate.

39. A process as set forth in claim 38 wherein the filler comprises a catalyst.

40. A process as set forth in claim 38 wherein the filler comprises at least one of a polyimide, polyethylene naphthalate, ethylene tetrafluoroethylene, polyvinylidene fluoride, polyester, polyamide, co-polyamide, polyamide elastomer, polyurethanes, polyurethane elastomer, or silicone.

41. A process as set forth in claim 38 wherein the central portion of the cathode catalyst layer includes at least one side edge spaced from the cathode side reduced-permeability layer a distance so that an cathode side gap exists between the central portion of the cathode catalyst layer and the cathode side reduced-permeability layer, and further comprising flowing a material comprising a filler and a volatile vehicle into the cathode side gap to fill the same and over at least a portion of the cathode side reduced-permeability and allowing the vehicle to evaporate to provide a cathode peripheral portion layer connected to the central portion of the cathode catalyst layer.

42. A process as set forth in claim 41 wherein the filler comprises a catalyst.

43. A process as set forth in claim 41 wherein the filler comprises at least one of a polyimide, polyethylene naphthalate, ethylene tetrafluoroethylene, polyvinylidene fluoride, polyester, polyamide, co-polyamide, polyamide elastomer, polyurethanes, polyurethane elastomer, or silicone.

44. A process as set forth in claim 23, wherein each of the reduced-permeability layers at least inhibits permeation of reactant gas through said ionically conductive membrane.

45. A process as set forth in claim 23, wherein each of the reduced-permeability layers at least inhibits permeation of reactant gas from one side of said ionically conductive membrane to the other side at a peripheral edge.

46. A process as set forth in claim 23, wherein said permeability is a hydrogen permeability, an oxygen permeability, or both.

47. A process as set forth in claim 23, wherein each of the reduced-permeability layers comprises at least one of a polyimide, polyethylene naphthalate, ethylene tetrafluoroethylene, polyvinylidene fluoride, polyesters, polyamides, co-polyamides, polyamide elastomers, polyurethanes, polyurethane elastomers, silicones, or thermoplastic elastomers.

48. A process as set forth in claim 23, wherein at least one of the reduced-permeability layers comprises a material with a hydrogen permeability below $1 \times 10^{-9}$ (ml(STP)-cm$_{thick}$)/(s-cm$^2$-cm$_{Hg}$) measured at 80° C. and 100% RH.

49. A process as set forth in claim 23, wherein at least one of the reduced-permeability layers comprises a material with a hydrogen permeability in the range of $1 \times 10^{-9}$ (ml(STP)-

$cm_{thick})/(s\text{-}cm^2\text{-}cm_{Hg})$ to $2\times10^{-10}$ $(ml(STP)\text{-}cm_{thick})/(s\text{-}cm^2\text{-}cm_{Hg})$ measured at 80C and 100% RH.

50. A process as set forth in claim 23, wherein at least one of the reduced-permeability layers comprises a material with an oxygen permeability below 3500 cc-mil/(100 in²-24 hr-atm) measured at 77° F. and 100% RH.

51. A process as set forth in claim 23, wherein at least one of the reduced-permeability layers comprises a material with an oxygen permeability in the range of 3.4 cc-mil/(100 in²-24 hr-atm) to 200 cc-mil/(100 in²-24 hr-atm) measured at 77F and 100% RH.

52. A process as set forth in claim 23 further comprising placing an anode side gas diffusion media layer over the anode catalyst layer and a first bipolar plate over the anode side gas diffusion media layer, and placing a cathode side gas diffusion media layer over the cathode catalyst layer and a first bipolar plate over the anode side gas diffusion media layer.

53. A process as set forth in claim 23 wherein the hot pressing comprises heating the anode catalyst decal, anode side reduced-permeability layer, membrane, cathode side reduced-permeability layer, and cathode layer to a temperature ranging from 280F to 400F and applying a pressure ranging from 100 psi to 500 psi to the same.

54. A process as set forth in claim 23 further comprising a hydrogen/oxygen recombination catalyst, and wherein the hydrogen/oxygen recombination catalyst is at least one of: impregnated into at least one of the anode side reduced-permeability layer or the cathode side reduced-permeability layer; or coated on at least one of the anode side reduced-permeability layer, the cathode side reduced-permeability layer or the membrane.

55. A process as set forth in claim 23 further comprising a hydrogen/oxygen recombination catalyst coating on both of the anode side reduced-permeability layer and the cathode side reduced-permeability layer and the membrane.

56. A process as set forth in claim 23 further comprising a hydrogen/oxygen recombination catalyst coating on one of the anode side reduced-permeability layer and the cathode side reduced-permeability layer and the membrane, and wherein the hydrogen/oxygen recombination catalyst coating overlaps a portion of the other reduced-permeability layer.

57. A process as set forth in claim 23 further comprising a hydrogen/oxygen recombination catalyst coating on one of the anode side reduced-permeability layer and the cathode side reduced-permeability layer and the membrane, and wherein the hydrogen/oxygen recombination catalyst coating overlaps a portion of the other reduced-permeability layer a distance ranging from 25-1000 microns.

58. A process as set forth in claim 23 further comprising a hydrogen/oxygen recombination catalyst coating attached to one of the anode side reduced-permeability layer and the cathode side reduced-permeability, and wherein the hydrogen/oxygen recombination catalyst coating extends into the opening of the reduced-permeability layer on which the recombination catalyst is attached.

59. A process comprising:
providing an ionically conductive membrane having an anode face and a cathode face;
placing an anode side reduced-permeability layer over the anode face, and wherein the anode side reduced-permeability layer includes in opening therethrough;
placing an anode catalyst decal consisting essentially of a central portion of an anode catalyst layer and a backing so that the central portion of the anode catalyst layer is aligned with the opening in the anode side reduced-permeability layer;
placing a cathode side reduced-permeability layer over the cathode face, and wherein the cathode side reduced-permeability layer includes in opening therethrough;
placing a cathode catalyst decal consisting essentially of a central portion of an cathode catalyst layer and a backing so that the central portion of the cathode catalyst layer is aligned with the opening in the cathode side reduced-permeability layer;
hot pressing the anode catalyst decal, anode side reduced-permeability layer, membrane, cathode catalyst decal, cathode side reduced-permeability layer together so that the central portion of the anode catalyst layer is received in the opening in the anode side reduced-permeability layer and so that the central portion of the cathode catalyst layer in received in the opening in the cathode side reduced-permeability layer;
removing the backing from the anode catalyst decal and removing the backing from the cathode catalyst decal;
wherein the central portion of the anode catalyst layer includes at least one side edge spaced from the anode side reduced-permeability layer a distance so that an anode side gap exist between the central portion of the anode catalyst layer and the anode side reduced-permeability layer, and further comprising flowing a first material comprising a first filler and a first volatile vehicle at least into the anode side gap to fill the same and allowing the first vehicle to evaporate;
wherein the central portion of the cathode catalyst layer includes at least one side edge spaced from the cathode side reduced-permeability layer a distance so that an cathode side gap exist between the central portion of the cathode catalyst layer and the cathode side reduced-permeability layer, and further comprising flowing a second material comprising a second filler and a second volatile vehicle at least into the cathode side gap to fill the same and allowing the second vehicle to evaporate,
and wherein each of the anode side reduced-permeability layer and cathode side reduced-permeability layer each have a permeability that is less than a permeability of the ionically conductive membrane.

60. A process as set forth in claim 59 wherein at least one of the first filler or the second filler comprises a catalyst.

61. A process as set forth in claim 59 wherein at least one of the first filler and the second filler comprises at least one of a polyimide, polyethylene naphthalate, ethylene tetrafluoroethylene, polyvinylidene fluoride, polyester, polyamide, co-polyamide, polyamide elastomer, polyurethanes, polyurethane elastomer, or silicone.

* * * * *